(12) United States Patent
Zhai

(10) Patent No.: US 12,276,787 B2
(45) Date of Patent: Apr. 15, 2025

(54) COMPENSATING LENS SET AND VIRTUAL REALITY APPARATUS WITH THE SAME

(71) Applicant: Goertek Inc., Shandong (CN)

(72) Inventor: Ruizhi Zhai, Shandong (CN)

(73) Assignee: Goertek Inc., Shandong (CN)

( * ) Notice: Subject to any disclaimer, the term of this patent is extended or adjusted under 35 U.S.C. 154(b) by 607 days.

(21) Appl. No.: 17/616,257

(22) PCT Filed: Dec. 27, 2019

(86) PCT No.: PCT/CN2019/129179
§ 371 (c)(1),
(2) Date: Dec. 3, 2021

(87) PCT Pub. No.: WO2020/244213
PCT Pub. Date: Dec. 10, 2020

(65) Prior Publication Data
US 2022/0252877 A1 Aug. 11, 2022

(30) Foreign Application Priority Data
Jun. 3, 2019 (CN) .......................... 201910479424.3

(51) Int. Cl.
*G02B 27/01* (2006.01)
*G02B 27/09* (2006.01)
*G06T 19/00* (2011.01)

(52) U.S. Cl.
CPC ..... *G02B 27/0101* (2013.01); *G02B 27/0955* (2013.01); *G06T 19/006* (2013.01)

(58) Field of Classification Search
CPC .............. G02B 27/017; G02B 27/0172; G02B 2027/0178
See application file for complete search history.

(56) References Cited

U.S. PATENT DOCUMENTS 5,517,366 A * 5/1996 Togino ............... G02B 17/0804
359/728
5,644,436 A * 7/1997 Togino ................... G02B 13/18
359/730

(Continued)

FOREIGN PATENT DOCUMENTS

| CN | 1419149 A | 5/2003 |
| CN | 103995355 A | 8/2014 |
| CN | 110161696 A | 8/2019 |

*Primary Examiner* — Bao-Luan Q Le
(74) *Attorney, Agent, or Firm* — Baker Botts LLP

(57) ABSTRACT

Disclosed are a compensating lens set and a virtual reality apparatus with the same. The compensating lens set is applied to a folded optical path system. The folded optical path system sequentially comprises, in an optical axis direction, a display unit, a first lens set and a diaphragm. The compensating lens set is arranged between the first lens set and the display unit, the compensating lens set comprising a first compensating lens, the first compensating lens comprising a first surface and a second surface. The first lens set comprises a third surface and a fourth surface. An incident light emitted by the display unit enters the first compensating lens from the first surface, and is emitted out of the first compensating lens from the second surface, passes through the first lens set, and then is transmitted to the diaphragm.

6 Claims, 15 Drawing Sheets

(56) References Cited

U.S. PATENT DOCUMENTS

| | | | | |
|---|---|---|---|---|
| 5,654,828 A * | 8/1997 | Togino | | G02B 25/001 |
| | | | | 359/633 |
| 5,659,430 A * | 8/1997 | Togino | | G02B 17/086 |
| | | | | 359/731 |
| 6,366,400 B1 * | 4/2002 | Ohzawa | | G02B 27/0172 |
| | | | | 359/364 |
| 6,480,338 B1 * | 11/2002 | Ohzawa | | G02B 25/001 |
| | | | | 359/727 |
| 10,600,352 B1 * | 3/2020 | Wheelwright | | G03H 1/0248 |
| 10,890,776 B1 * | 1/2021 | Gao | | G02B 27/0172 |
| 11,054,622 B1 * | 7/2021 | Gollier | | G02B 27/0172 |
| 2002/0057498 A1 * | 5/2002 | Kobayashi | | G02B 27/0172 |
| | | | | 359/629 |
| 2013/0222896 A1 * | 8/2013 | Komatsu | | G02B 27/0172 |
| | | | | 359/365 |
| 2017/0068105 A1 * | 3/2017 | Yun | | G02B 27/286 |
| 2017/0248769 A1 | 8/2017 | Stamenov | | |
| 2017/0357100 A1 * | 12/2017 | Ouderkirk | | G02B 19/0028 |
| 2018/0031835 A1 * | 2/2018 | Hoppe | | G02B 27/283 |
| 2018/0239146 A1 * | 8/2018 | Bierhuizen | | G02B 17/0856 |
| 2019/0018255 A1 * | 1/2019 | Qin | | G02B 27/283 |
| 2019/0033567 A1 * | 1/2019 | Kajiyama | | G02B 17/0876 |
| 2019/0285902 A1 * | 9/2019 | Ouderkirk | | G02B 27/30 |
| 2019/0353906 A1 * | 11/2019 | Gollier | | G02B 5/3016 |
| 2020/0064592 A1 * | 2/2020 | Tashiro | | G02B 27/0075 |
| 2020/0073123 A1 * | 3/2020 | Martinez | | G02B 27/288 |
| 2020/0081234 A1 * | 3/2020 | Etter | | G02B 5/305 |
| 2020/0096780 A1 * | 3/2020 | Ouderkirk | | G02B 17/0856 |
| 2020/0158953 A1 * | 5/2020 | Tohara | | G02B 25/001 |
| 2020/0192079 A1 * | 6/2020 | Tohara | | G02B 27/0172 |
| 2020/0249475 A1 * | 8/2020 | Amirsolaimani | | G02B 5/3016 |
| 2020/0341267 A1 * | 10/2020 | Wong | | G02B 27/005 |
| 2020/0379226 A1 * | 12/2020 | Steiner | | G02B 5/3083 |

* cited by examiner

COMPENSATING LENS SET AND VIRTUAL REALITY APPARATUS WITH THE SAME

CROSS-REFERENCE TO RELATED APPLICATIONS

This application is a National Stage of International Application No. PCT/CN2019/129179, filed on Dec. 27, 2019, which claims priority to Chinese Patent Application No. 201910479424.3, filed on Jun. 3, 2019, both of which are hereby incorporated by reference in its entirety.

TECHNICAL FIELD

The present invention relates to the technical field of optical imaging, in particular to a compensating lens set and a virtual reality apparatus with the same.

BACKGROUND

In the prior art, the folded optical path system is usually used for achieving the light weight of the virtual reality apparatus in an optical path folding manner. Existing virtual reality apparatus adopting a folded optical path system typically lack optical compensation corresponding to its size reduction, leading to large aberration of a folded optical path system which causes distortion or deformation of an image observed by a user and brings negative influences on user experience of the virtual reality apparatus.

SUMMARY

The present invention provides a compensating lens set and a virtual reality apparatus with the same, so as to solve prior art problems relating to large aberration of a folded optical path system which causes distortion or deformation of an image observed by a user and brings negative influences on user experience of the virtual reality apparatus.

For achieving the above objective, the present invention provides a compensating lens set. The compensating lens set is applied to a folded optical path system, where the folded optical path system sequentially includes, in an optical axis direction, a display unit, a first lens set and a diaphragm;

the compensating lens set is arranged between the first lens set and the display unit, the compensating lens set including a first compensating lens, the first compensating lens including a first surface close to the display unit and a second surface away from the display unit, and the compensating lens set being configured to eliminate spherical aberration of the folded optical path system;

the first lens set includes a third surface close to the display unit and a fourth surface away from the display unit; wherein incident light emitted by the display unit are reflected by the third surface and the fourth surface; and wherein the incident light enters the first compensating lens from the first surface, is emitted out of the first compensating lens from the second surface, passes through the first lens set, and then is transmitted to the diaphragm.

Optionally, the first surface and the second surface are aspherical structures.

Optionally, the compensating lens set further includes a second compensating lens, the second compensating lens being arranged between the first compensating lens and the first lens set, and the second compensating lens being provided with a fifth surface close to the first compensating lens and a sixth surface away from the first compensating lens.

Optionally, the first surface, the second surface, the fifth surface and the sixth surface are all spherical surfaces, and a refractive power of the compensating lens set is the opposite of that of the first lens set.

Optionally, the first compensating lens and the second compensating lens are separated from each other or connected with each other by glue-bonding or tight-lock coupling.

Optionally, the first surface, the second surface, the fifth surface and the sixth surface are all aspherical structures.

Optionally, a distance from a center of the display unit to a center of the fourth surface is less than or equal to 25 mm.

Optionally, the compensating lens set is made of an optical plastic material.

For achieving the above objective, the present application provides a virtual reality apparatus. The virtual reality apparatus includes a folded optical path system and a compensating lens set, where the compensating lens set is the compensating lens set of any one of above implementation modes.

In the technical solution provided in the present application, the compensating lens set is applied to a folded optical path system, wherein: the folded optical path system includes a display unit, a first lens set and a diaphragm, and the first lens set includes a third surface close to the display unit and a fourth surface far away from the display unit, such that an incident light emitted by the display unit is reflected by the third surface and the fourth surface; the incident light emitted by the display unit enters the first compensating lens from the first surface, is emitted out of the first compensating lens from the second surface, passes through the first lens set, and then is transmitted to the diaphragm. With the combination of the compensating lens and the folded optical path system, spherical aberration of the folded optical path system is reduced under the condition that a total length of the folded optical path system is not influenced, so as to solve prior art problems relating to large spherical aberration of a folded optical path system which causes distortion or deformation of an image observed by a user and brings negative influences on user experience of the virtual reality apparatus.

BRIEF DESCRIPTION OF THE DRAWINGS

In order to more clearly illustrate technical solutions in the embodiments of the present invention or in the prior art, a brief introduction to the accompanying drawings required for the description of the embodiments or the prior art will be provided below. Obviously, the accompanying drawings in the following description are only some of the embodiments of the present invention, and those of ordinary skill in the art would also be able to derive other drawings from structures shown by these drawings without making creative efforts.

Figure 1:
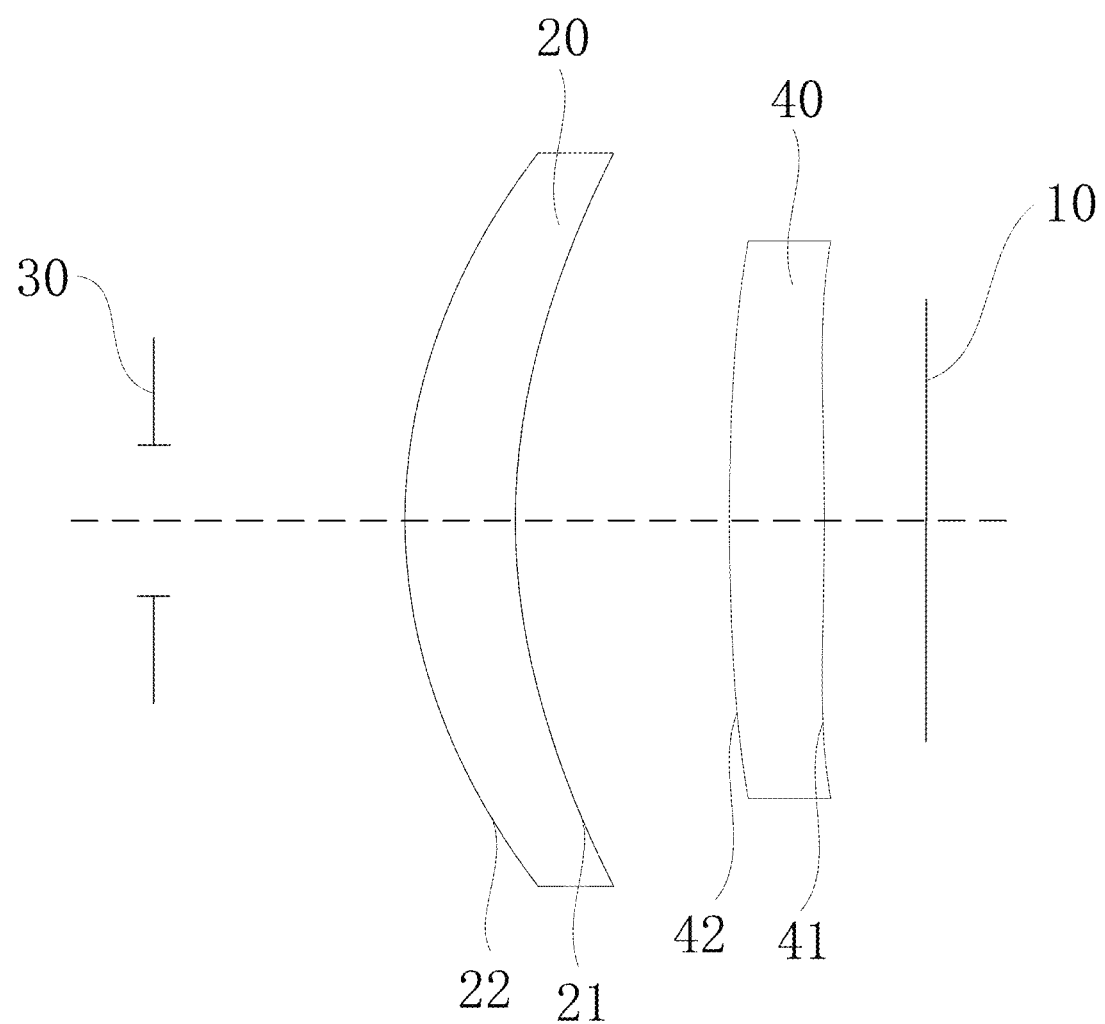
FIG. 1 is a schematic diagram of an optical structure of Embodiment 1 of a compensating lens set of the present invention.

| Brief description of the reference numbers: | |
|---|---|
| Reference number | Name |
| 10 | Display unit |
| 20 | First lens set |
| 21 | Third surface |
| 22 | Fourth surface |
| 30 | Diaphragm |
| 40 | First compensating lens |
| 41 | First surface |
| 42 | Second surface |
| 50 | Second compensating lens |
| 51 | Fifth surface |
| 52 | Sixth surface |

Achievement of the objectives, functional features and advantages of the present invention will be further described in conjunction with the embodiments and with reference to the accompanying drawings.

DESCRIPTION OF THE EMBODIMENTS

The technical solutions of embodiments of the present invention will be described below clearly and comprehensively in conjunction with accompanying drawings of the embodiments of the present invention. Apparently, the embodiments described are merely some embodiments rather than all embodiments of the present invention. Based on the embodiments of the present invention, other various embodiments obtained by those of ordinary skill in the art without making creative efforts fall within the scope of protection of the present invention.

It should be noted that all directionality indications (for example, up, down, left, right, front, back, . . . ) in embodiments of the present invention are merely used to explain relative positional relations, motion conditions, etc. between components in a certain specific posture (as shown in the accompanying drawings), and under the condition that the specific posture changes, the directionality indications change accordingly.

In addition, descriptions of "first", "second", and so forth in the embodiments of the present invention are for descriptive purposes only and are not to be construed as indicating or implying their relative importance or implicitly specifying the number of indicated technical features. Thus, features defined with "first" and "second" may explicitly or implicitly include at least one of the features. In the description of the present invention, "plurality" means two or more, for example, two, three, etc., unless expressly specified otherwise.

In the present invention, unless expressly specified otherwise, the terms "connect", "fix", etc. are to be construed broadly, for example, "fix" may be fixedly connected, or detachably connected, or integrally formed, may be mechanically connected, or electrically connected, may be direct connected or indirect connected via an intermediary medium, or may be a communication between two elements or an interworking relation between two elements, unless expressly defined otherwise. The specific meanings of the above terms in the present invention may be understood on a case-by-case basis for those of ordinary skill in the art.

In addition, the technical solutions of the embodiments in the present invention may be combined with one another, which must be based on the achievement by the ordinary skill in the art, and when the combinations of the technical solutions contradict each other or cannot be achieved, it should be considered that the combinations of the technical solutions do not exist and are not within the scope of protection claimed in the present invention.

The present invention provides a compensating lens set and a virtual reality apparatus with the same.

With reference to FIG. 1, the compensating lens set is applied to a folded optical path system, where the folded optical path system sequentially includes, in an optical axis direction, a display unit 10, a first lens set 20 and a diaphragm 30;

the compensating lens set is arranged between the first lens set 20 and the display unit 10, the compensating lens set includes a first compensating lens 40, the first compensating lens 40 including a first surface 41 close to the display unit 10 and a second surface 42 away from the display unit 10, and the compensating lens set is configured to eliminate spherical aberration of the folded optical path system;

the first lens set 20 includes a third surface 21 close to the display unit 10 and a fourth surface 22 away from the display unit 10; incident light emitted by the display unit 10 are reflected by the third surface 21 and the fourth surface 22; and the incident light enters the first compensating lens 40 from the first surface 41, is emitted out of the first compensating lens 40 from the second surface 42, passes through the first lens set 20, and then is transmitted to the diaphragm 30.

In the technical solution provided in the present application, the compensating lens set is applied to a folded optical path system, where the folded optical path system includes a display unit 10, a first lens set 20 and a diaphragm 30, and the first lens set 20 includes a third surface 21 close to the display unit 10 and a fourth surface 22 far away from the display unit 10, such that incident light emitted by the display unit 10 is reflected by the third surface 21 and the fourth surface 22; and the incident light emitted by the display unit 10 enters the first compensating lens 40 from the first surface 41, is emitted out of the first compensating lens 40 from the second surface 42, passes through the first lens set 20, and then is transmitted to the diaphragm 30. By means of the combined use of the compensating lens and the folded optical path system, spherical aberration of the folded optical path system is reduced under the condition that a total length of the folded optical path system is not influenced, so as to solve prior art problems relating to large aberration of a folded optical path system which causes distortion or deformation of an image observed by a user and brings negative influences on user experience of the virtual reality apparatus.

It will be appreciated that, in addition to eliminating a spherical aberration of the folded optical path system, the compensating lens set may eliminate or reduce other aberration of the folded optical path system to an extent feasible for optical design, where the aberration includes but is not limited to coma, astigmatism, field curvature, distortion, and other imaging defects influencing optical imaging.

In a preferred implementation mode, the first surface 41 and the second surface 42 are aspherical structures. Specifically, compared with a spherical structure, the aspherical structure may effectively reduce the spherical aberration and distortion of the optical system, so as to reduce the number of lens in the optical system and a size of the lens.

In some optional implementation modes, the compensating lens set further includes a second compensating lens 50, specifically, the second compensating lens 50 is arranged between the first compensating lens 40 and the first lens set 20, and the second compensating lens 50 is provided with a fifth surface 51 close to the first compensating lens 40 and a sixth surface 52 away from the first compensating lens 40. The incident light emitted by the display unit 10 enters the first compensating lens 40 from the first surface 41, is emitted out of the first compensating lens 40 from the second surface 42, enters the second compensating lens 50 by means of the fifth surface 51, is emitted out of the second compensating lens 50 from the sixth surface 52, and enters the folded light path system. The spherical aberration of the folded optical path system is further reduced by means of the combined use of the first compensating lens 40 and the second compensating lens 50.

In a preferred implementation mode, the first surface 41, the second surface 42, the fifth surface 51 and the sixth surface 52 are all spherical surfaces, and a refractive power of the compensating lens set is the opposite of that of the first lens set 20. The refractive power is a difference between a convergence degree of an image-side light beam and a convergence degree of an object-side light beam, and is used for representing refraction capability of the optical system one the incident parallel light beam.

In some optional implementation modes, the first compensating lens 40 and the second compensating lens 50 are separated from each other or connected with each other by glue-bonding or tight-lock coupling.

In some optional implementation modes, the first surface 41, the second surface 42, the fifth surface 51 and the sixth surface 52 are all aspherical surfaces. Specifically, compared with a spherical structure, the aspherical structure may effectively reduce the spherical aberration and distortion of the optical system, so as to reduce the number of lens in the optical system and a size of the lens.

In a preferred implementation mode, a distance from a center of the display unit 10 to a center of the fourth surface is less than or equal to 25 mm.

In some optional implementation modes, the compensating lens set is made of an optical plastic material. Specifically, compared with optical glass, the optical plastic has the advantages of good plastic forming process feature, light weight, low cost, etc., and therefore a size and the cost of the compensating lens set may be effectively reduced.

Figure 2:
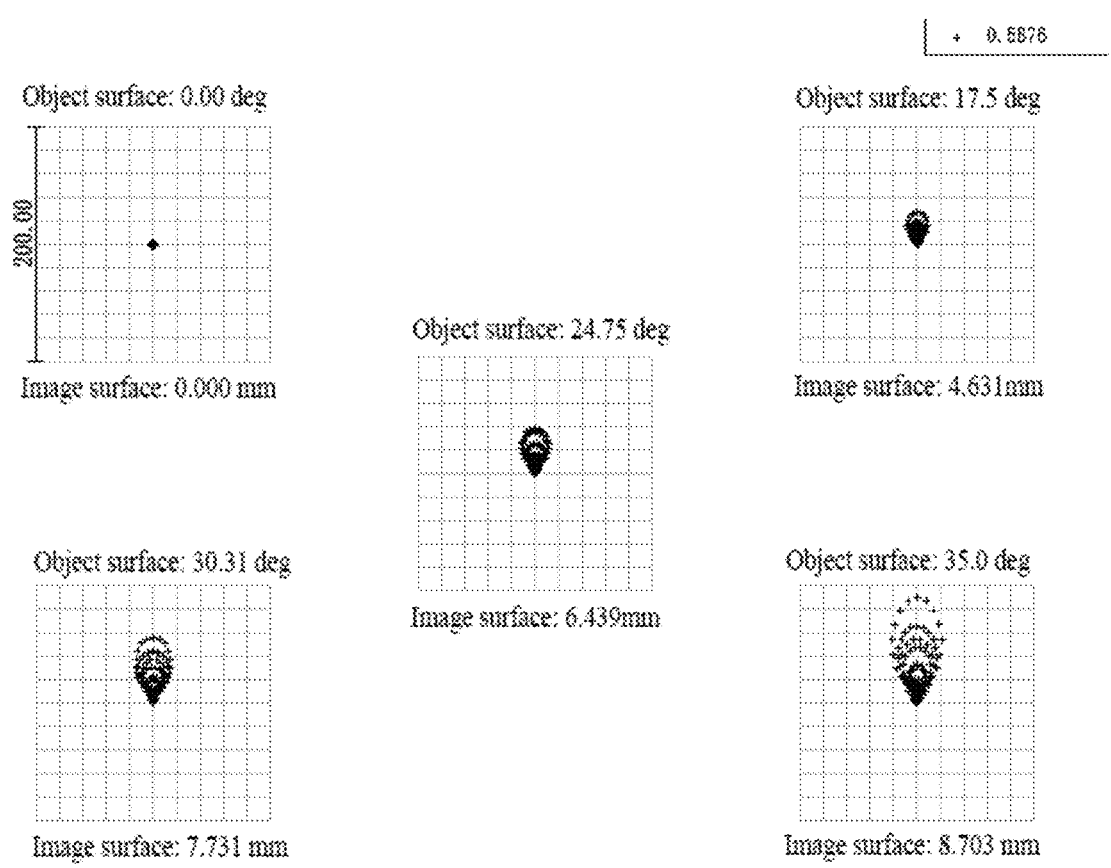
FIG. 2 is a spot diagram of Embodiment 1 of the compensating lens set of the present invention.
Figure 3:
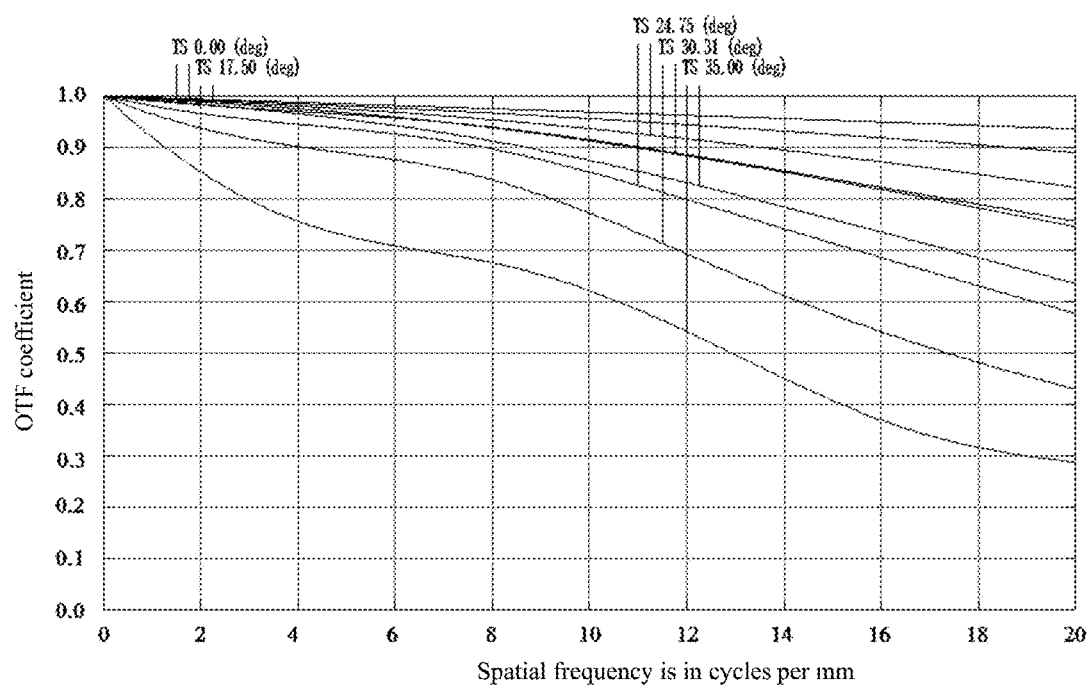
FIG. 3 is a diagram of a modulation transfer function of Embodiment 1 of the compensating lens set of the present invention.

With reference to FIGS. 1-3, in Embodiment 1, the folded optical path system is of a single-lens structure, the compensating lens is of a single-lens structure, and optical system design data is shown in Table 1 below:

TABLE 1

| Type | Surface number | Surface type | Curvature | Thickness | Material | Dimensional radius | Cone coefficient | α4 |
|---|---|---|---|---|---|---|---|---|
| | Object surface | Aspherical | Infinity | Infinity | | 3 | 0 | |
| | Diaphragm 30 | Aspherical | Infinity | 10 | | 14.58 | 0 | |
| Folded optical path system | Fourth surface 22 | Aspherical | 21.15 | 4.39 | E48R | 14.58 | −1 | 6.12E-06 |
| | Third surface 21 | Aspherical | 24.81 | 8.52 | | 14.58 | −3.27 | 5.52E-06 |
| Compensating lens set | Second surface 42 | Aspherical | 114.87 | 3.78 | E48R | 11.08 | 20 | 1.22E-05 |
| | First surface 41 | Aspherical | −118.56 | 4.05 | | 11.08 | −20 | 4.98E-05 |
| | Image surface | Spherical | Infinity | | | 8.79 | 0 | |

In Embodiment 1, parameters of the folded optical path system are as follows:

A maximum field of view of the folded optical path system is 70 degrees, and a system length of the folded optical path system is less than 13 mm, the system length of the folded optical path system referring to a distance from the display unit 10 to a side surface, away from the display unit 10, of the folded optical path system. A lens diameter of the folded optical path system is less than 40 mm, an optical transfer function value of the folded optical path system at a frequency of 201 p/mm is greater than or equal to 0.5, a system focal length of the folded optical path system is 16.19 mm, and spherical aberration (SPHA) of the folded optical path system is 0.27.

The first surface 41 and the second surface 42 may be an even-order aspherical structure, where an even-order aspherical surface satisfies the following relation:

$$z = \frac{CY^2}{1+\sqrt{1+(1+k)C^2Y^2}} + \sum_{i=2}^{N} \alpha_i Y^{2i}$$

where Y is a center height of a lens surface, Z is a displacement value of the aspherical structure from the optical axis by taking a surface vertex as the reference at a position with a height Y in the optical axis direction, C is a curvature radius of a vertex of the aspherical surface, and K is a cone coefficient; and αi represents an aspherical coefficient at the 1st time.

In another embodiment, the second surface 42 and the fourth surface 22 may also be odd-order aspherical structures, where an odd-order aspherical surface satisfies the following relation:

$$z = \frac{CY^2}{1+\sqrt{1+(1+k)C^2Y^2}} + \sum_{i=2}^{N} \beta_i Y^i$$

where Y is a center height of a lens surface, Z is a displacement value of the aspherical structure from the optical axis by taking a surface vertex as the reference at a position with a height Y in the optical axis direction, C is a curvature radius of a vertex of the aspherical surface, and K is a cone coefficient; and βi represents an aspherical coefficient at the 1st time.

With reference to FIG. 2, a spot diagram of Embodiment 1 is shown. The spot diagram is a diffuse pattern where after a plurality of lights passes through the optical system, intersection points of the lights emitted from a point and an image surface are not concentrated at a same point due to aberration and spread over in a certain range, and the diffuse pattern is used for evaluating imaging quality of the projection optical system. In Embodiment 1, a maximum value of image points in the spot diagram corresponds to a maximum field of view, and the maximum value of image points in the spot diagram is less than 8.703 mm.

With reference to FIG. 3, a diagram of a modulation transfer function of Embodiment 1 is shown. The modulation transfer function (MTF) refers to a relation between a modulation degree and the number of line pair per millimeter in an image and is used for evaluating ability to restore scenery details.

Figure 4:
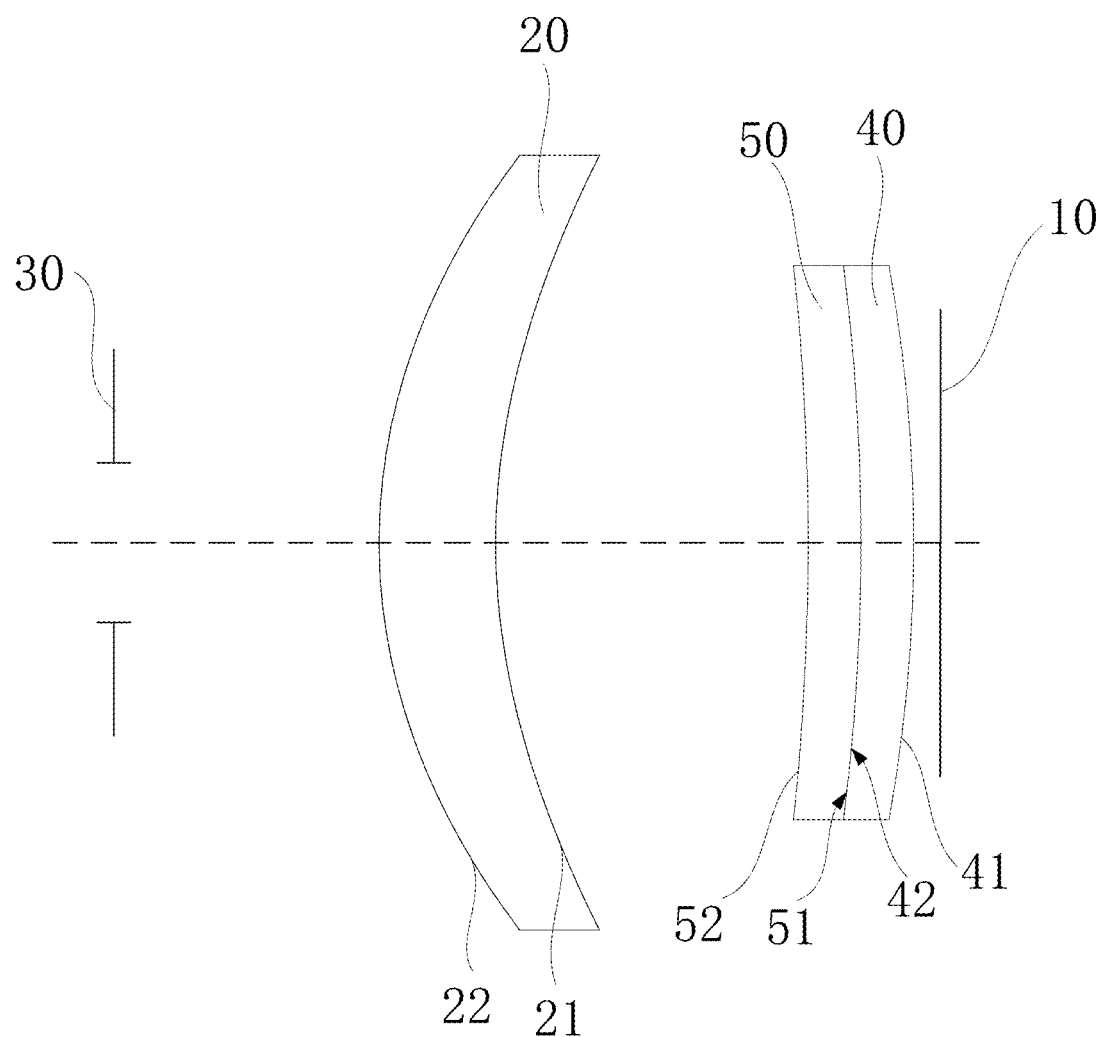
FIG. 4 is a schematic diagram of an optical structure of Embodiment 2 of the compensating lens set of the present invention.
Figure 5:
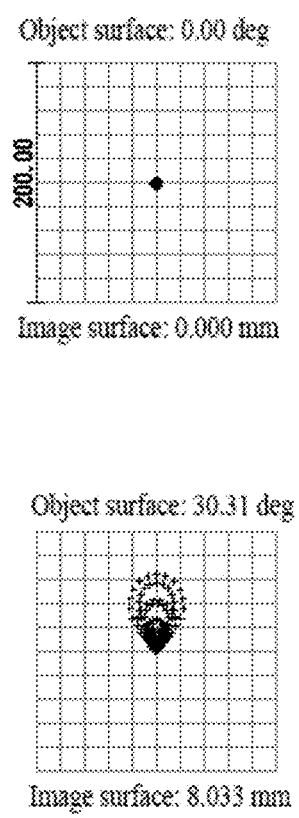
FIG. 5 is a spot diagram of Embodiment 2 of the compensating lens set of the present invention.
Figure 5:
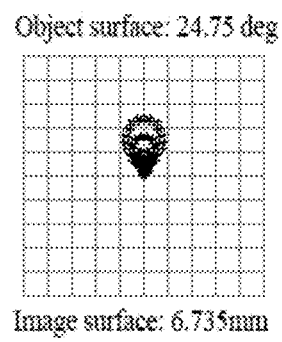
Figure 5:
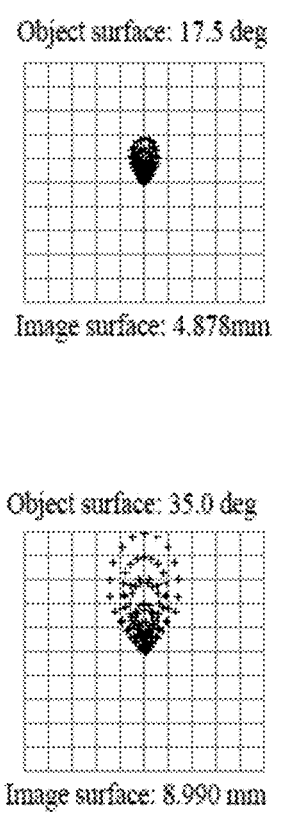
Figure 6:
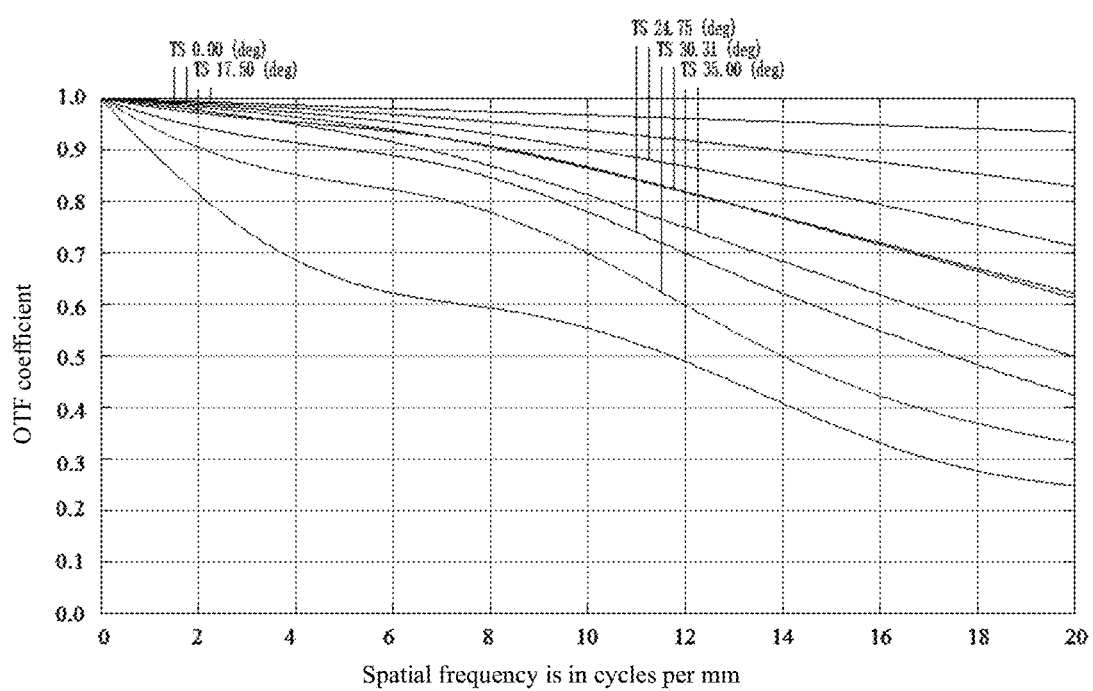
FIG. 6 is a diagram of a modulation transfer function of Embodiment 2 of the compensating lens set of the present invention.

With reference to FIGS. 4-6, in Embodiment 2, the folded optical path system is of a single-lens structure, the compensating lens is of a double-glued spherical lens structure, and optical system design data is shown in Table 2 below:

TABLE 2

| Type | Surface number | Surface type | Curvature | Thickness | Material | Dimensional radius | Cone coefficient | α4 |
|---|---|---|---|---|---|---|---|---|
| | Object surface | Aspherical | Infinity | Infinity | | 3 | 0 | |
| | Diaphragm 30 | Aspherical | Infinity | 10 | | 14.58 | 0 | |
| Folded optical path system | Fourth surface 22 | Aspherical | 21.15 | 4.39 | E48R | 14.58 | −1 | 6.12E-06 |
| | Third surface 21 | Aspherical | 24.81 | 11.78 | | 14.58 | −3.27 | 5.52E-06 |
| Compensating lens set | Sixth surface 52 | Spherical | −100 | 1.99 | E48R | 10.42 | | |
| | Fifth surface 51 | Spherical | −83.51 | 0 | | 10.42 | | |
| | Second surface 42 | Spherical | −83.51 | 1.99 | PMMA | 10.42 | | |
| | First surface 41 | Spherical | −58.74 | 1 | | 10.42 | | |
| | Image surface | Spherical | Infinity | | | 9.09 | 0 | |

In Embodiment 2, parameters of the folded optical path system are as follows:

A maximum field of view of the folded optical path system is 70 degrees, and a system length of the folded optical path system is less than 13 mm, the system length of the folded optical path system referring to a distance from the display unit 10 to a side surface, away from the display unit 10, of the folded optical path system. A lens diameter of the folded optical path system is less than 40 mm, an optical transfer function value of the folded optical path system at a frequency of 201 p/mm is greater than or equal to 0.5, a system focal length of the folded optical path system is 16.19 mm, and SPHA of the folded optical path system is 0.27.

With reference to FIG. 5, a spot diagram of Embodiment 2 is shown. The spot diagram is a diffuse pattern where after a plurality of lights passes through the optical system, intersection points of the lights emitted from a point and an image surface are not concentrated at a same point due to aberration and spread over in a certain range, and the diffuse pattern is used for evaluating imaging quality of the projection optical system. In Embodiment 2, a maximum value of image points in the spot diagram corresponds to a maximum field of view, and the maximum value of image points in the spot diagram is less than 8.990 mm.

With reference to FIG. 6, a diagram of a MTF of Embodiment 2 is shown. The MTF refers to a relation between a modulation degree and the number of line pair per millimeter in an image and is used for evaluating ability to restore scenery details.

Figure 7:
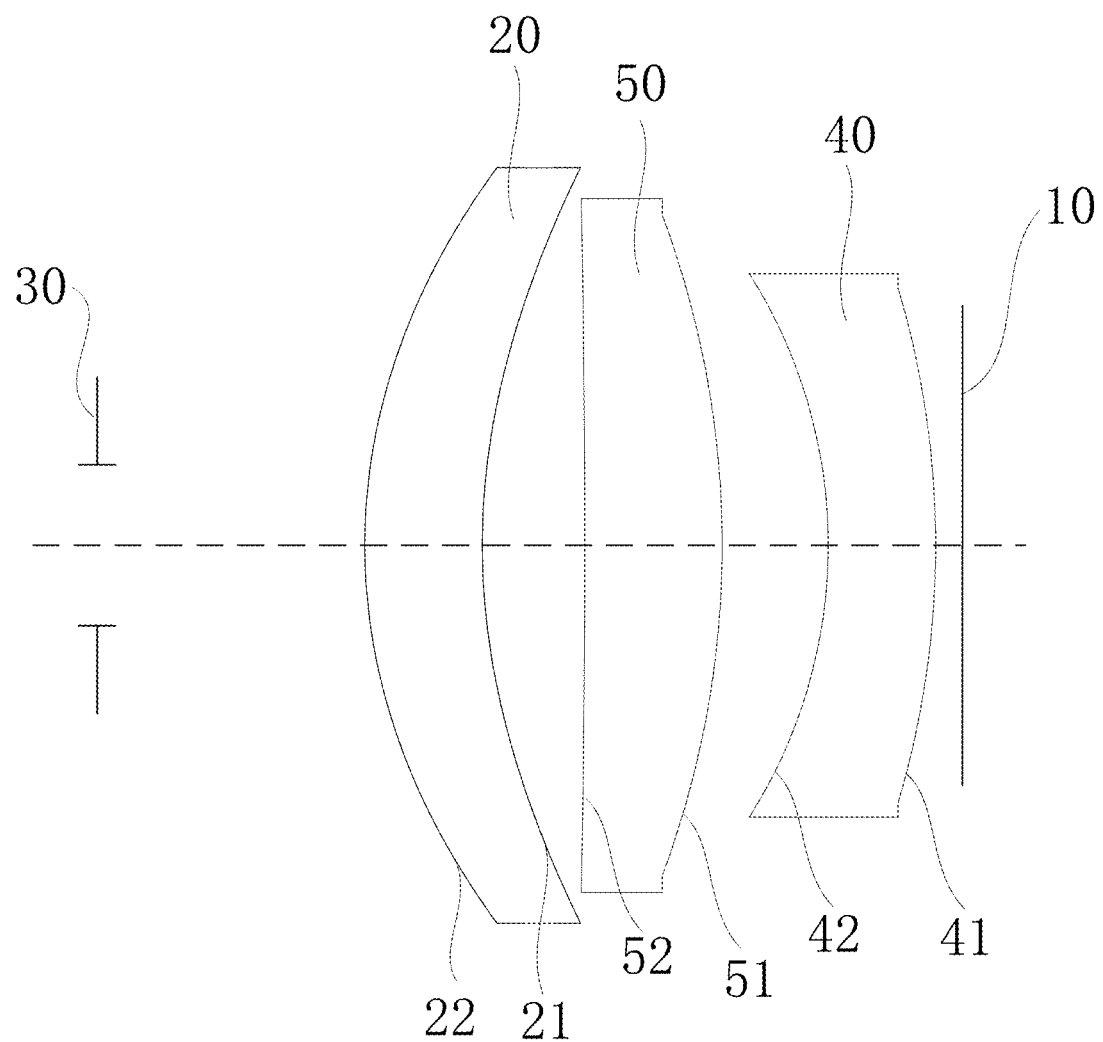
FIG. 7 is a schematic diagram of an optical structure of Embodiment 3 of the compensating lens set of the present invention.
Figure 8:
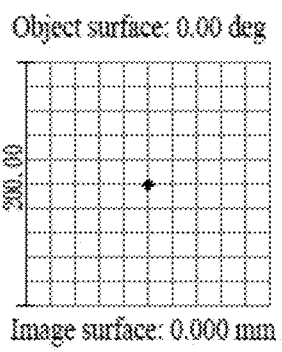
FIG. 8 is a spot diagram of Embodiment 3 of the compensating lens set of the present invention.
Figure 8:
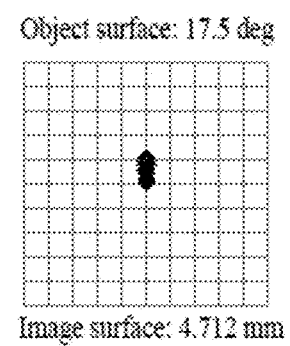
Figure 8:
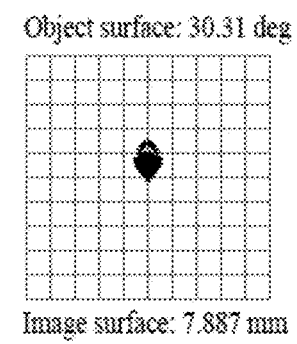
Figure 8:
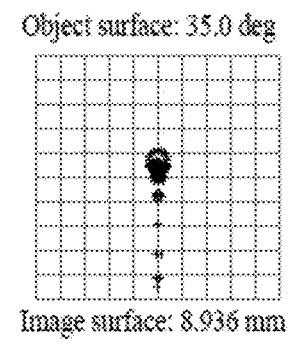
Figure 9:
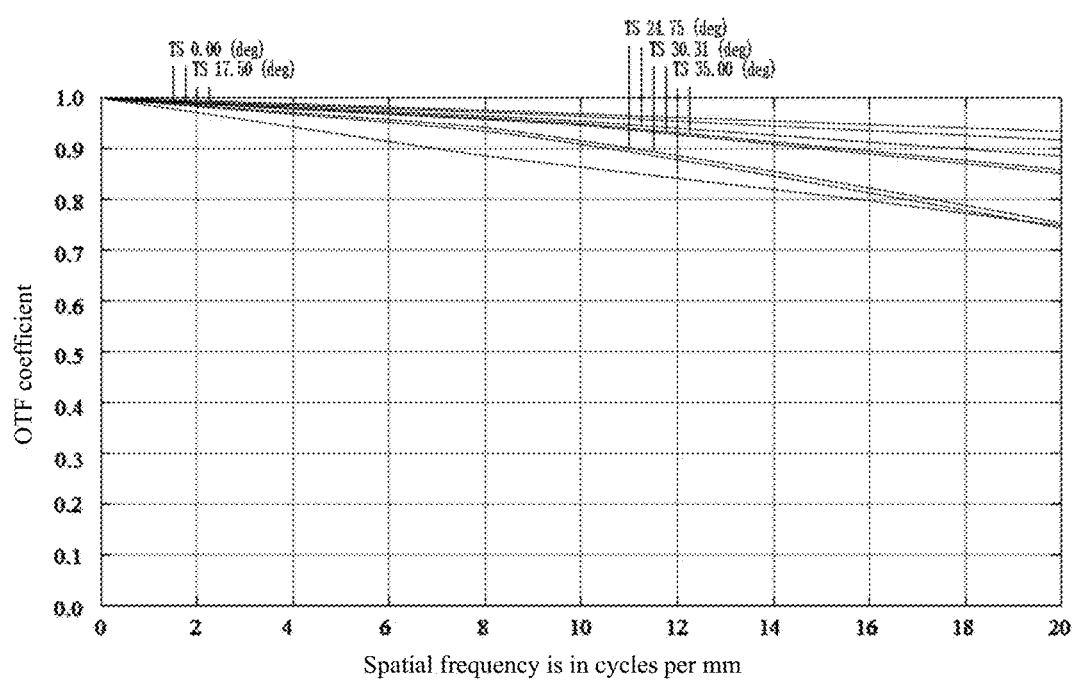
FIG. 9 is a diagram of a modulation transfer function of Embodiment 3 of the compensating lens set of the present invention.

With reference to FIGS. 7-9, in Embodiment 3, the folded optical path system is of a single-lens structure, the compensating lens is a separated spherical lens combination; and optical system design data is shown in Table 3 below:

TABLE 3

| Type | Surface number | Surface type | Curvature | Thickness | Material | Dimensional radius | Cone coefficient | α4 |
| --- | --- | --- | --- | --- | --- | --- | --- | --- |
| | Object surface | Aspherical | Infinity | Infinity | | 3 | 0 | |
| | Diaphragm 30 | Aspherical | Infinity | 10 | | 14.58 | 0 | |
| Folded optical path system | Fourth surface 22 | Aspherical | 21.15 | 4.39 | E48R | 14.58 | −1 | 6.12E-06 |
| | Third surface 21 | Aspherical | 24.81 | 8.52 | | 14.58 | −3.27 | 5.52E-06 |
| Compensating lens set | Sixth surface 52 | Spherical | −625.87 | 5.13 | E48R | 12.94 | | |
| | Fifth surface 51 | Spherical | −34.97 | 3.96 | | 12.32 | | |
| | Second surface 42 | Spherical | −18.89 | 4.01 | PMMA | 10.13 | | |
| | First surface 41 | Spherical | −33.43 | 1 | | 9.64 | | |
| | Image surface | Spherical | Infinity | | | 8.96 | 0 | |

In Embodiment 3, parameters of the folded optical path system are as follows:

A maximum field of view of the folded optical path system is 70 degrees, and a system length of the folded optical path system is less than 13 mm, the system length of the folded optical path system referring to a distance from the display unit 10 to a side surface, away from the display unit 10, of the folded optical path system. A lens diameter of the folded optical path system is less than 40 mm, an optical transfer function value of the folded optical path system at a frequency of 201 p/mm is greater than or equal to 0.5, a system focal length of the folded optical path system is 16.19 mm, and SPHA of the folded optical path system is 0.27.

With reference to FIG. 8, a spot diagram of Embodiment 3 is shown. The spot diagram is a diffuse pattern where after a plurality of lights passes through the optical system, intersection points of the lights emitted from a point and an image surface are not concentrated at a same point due to aberration and spread over in a certain range, and the diffuse pattern is used for evaluating imaging quality of the projection optical system. In Embodiment 3, a maximum value of image points in the spot diagram corresponds to a maximum field of view, and the maximum value of image points in the spot diagram is 8.936 mm.

With reference to FIG. 9, a diagram of a MTF of Embodiment 3 is shown. The MTF refers to a relation between a modulation degree and the number of line pair per millimeter in an image and is used for evaluating ability to restore scenery details.

Figure 10:
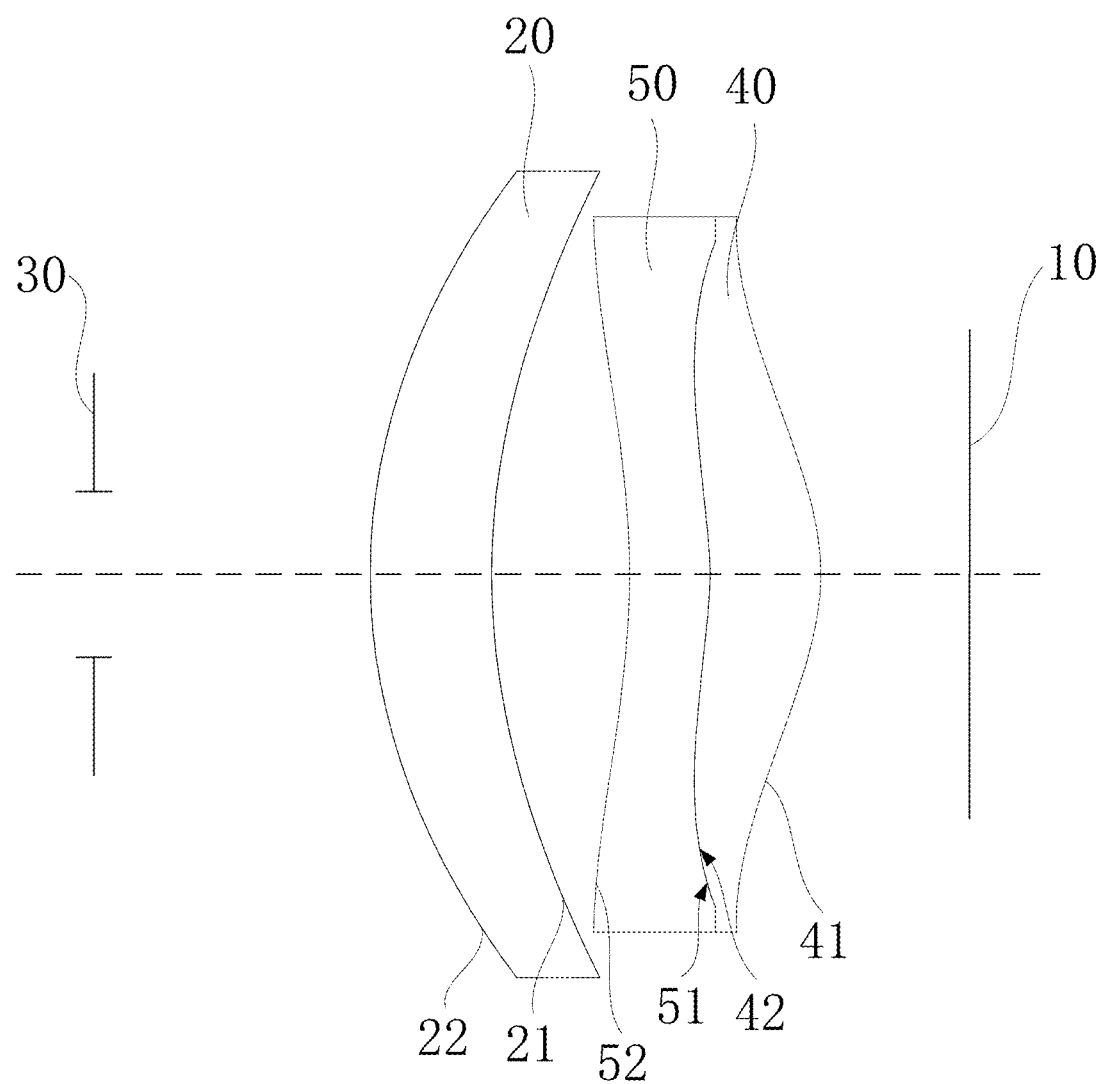
FIG. 10 is a schematic diagram of an optical structure of Embodiment 4 of the compensating lens set of the present invention.
Figure 11:
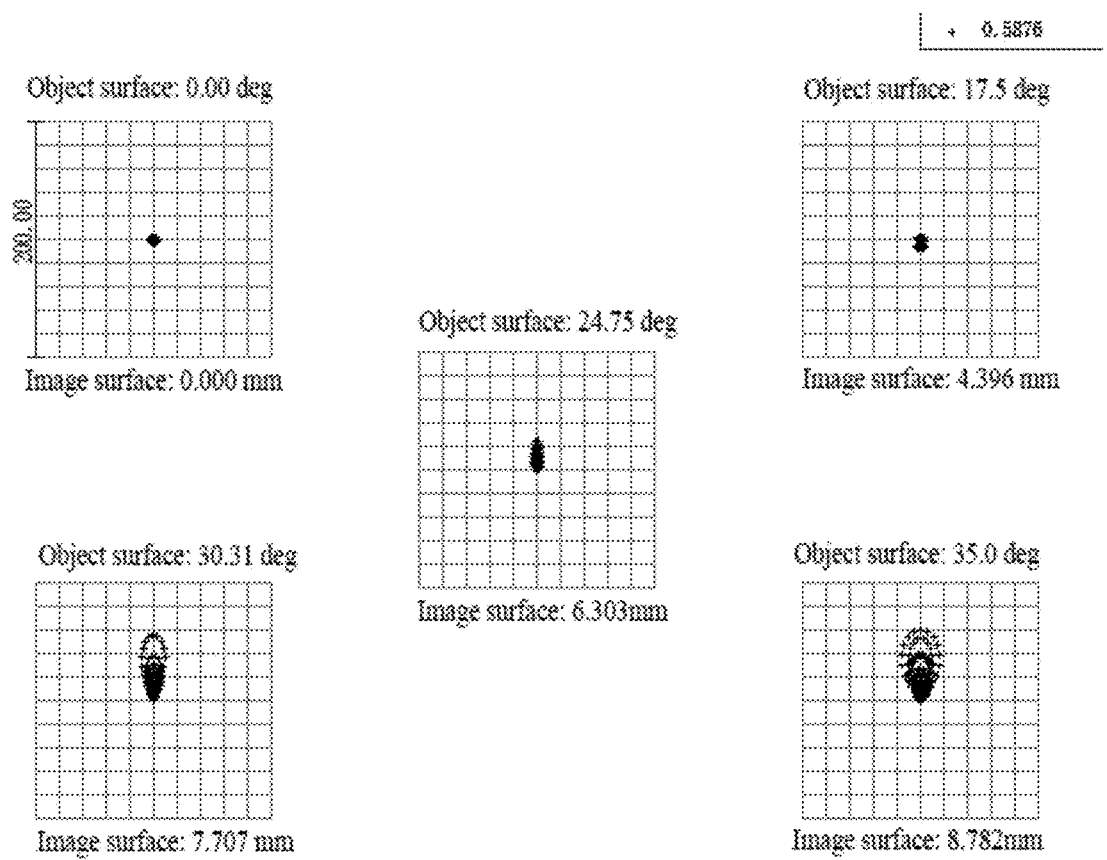
FIG. 11 is a spot diagram of Embodiment 4 of the compensating lens set of the present invention.
Figure 12:
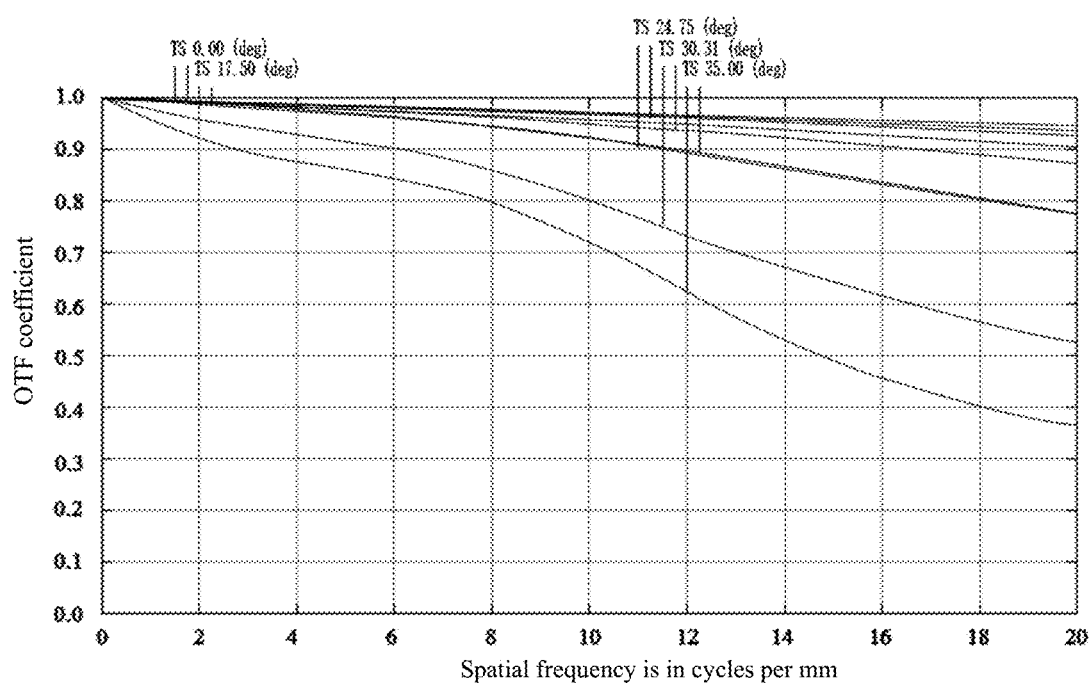
FIG. 12 is a diagram of a modulation transfer function of Embodiment 4 of the compensating lens set of the present invention.

With reference to FIGS. 10-12, in Embodiment 4, the folded optical path system is of a single-lens structure, the compensating lens is of a double-glued aspherical lens structure, and optical system design data is shown in Table 4 below:

TABLE 4

| Type | Surface number | Surface type | Curvature | Thickness | Material | Dimensional radius | Cone coefficient | α4 |
| --- | --- | --- | --- | --- | --- | --- | --- | --- |
| | Object surface | Aspherical | Infinity | Infinity | | 3 | 0 | |
| | Diaphragm 30 | Aspherical | Infinity | 10 | | 14.58 | 0 | |
| Folded optical path system | Fourth surface 22 | Aspherical | 21.15 | 4.39 | E48R | 14.58 | −1 | 6.12E-06 |
| | Third surface 21 | Aspherical | 24.81 | 8.52 | | 14.58 | −3.27 | 5.52E-06 |
| Compensating lens set | Sixth surface 52 | Aspherical | −30.06 | 2.92 | E48R | 12.94 | | 2.97E-05 |
| | Fifth surface 51 | Aspherical | −10.55 | 0 | | 12.02 | | 7.59E-05 |
| | Second surface 42 | Aspherical | −10.55 | 1.99 | PMMA | 12.02 | | 7.59E-05 |
| | First surface 41 | Aspherical | −8.71 | 1 | | 12.94 | | 6.01E-05 |
| | Image surface | Spherical | Infinity | | | 8.84 | 0 | |

In Embodiment 4, parameters of the folded optical path system are as follows:

A maximum field of view of the folded optical path system is 70 degrees, and a system length of the folded optical path system is less than 13 mm, the system length of the folded optical path system referring to a distance from the display unit 10 to a side surface, away from the display unit 10, of the folded optical path system. A lens diameter of the folded optical path system is less than 40 mm, an optical transfer function value of the folded optical path system at a frequency of 201 p/mm is greater than or equal to 0.5, a system focal length of the folded optical path system is 16.19 mm, and SPHA of the folded optical path system is 0.27.

The first surface 41 and the second surface 42 may be an even-order aspherical structure, where an even-order aspherical surface satisfies the following relation:

$$z = \frac{CY^2}{1 + \sqrt{1 + (1+k)C^2Y^2}} + \sum_{i=2}^{N} \alpha_i Y^{2i}$$

where Y is a center height of a lens surface, Z is a displacement value of the aspherical structure from the optical axis by taking a surface vertex as the reference at a position with a height Y in the optical axis direction, C is a curvature radius of a vertex of the aspherical surface, and K is a cone coefficient; and $\alpha_i$ represents an aspherical coefficient at the 1st time.

In another embodiment, the second surface 42 and the fourth surface 22 may also be odd-order aspherical structures, where an odd-order aspherical surface satisfies the following relation:

$$z = \frac{CY^2}{1 + \sqrt{1 + (1+k)C^2Y^2}} + \sum_{i=2}^{N} \beta_i Y^i$$

where Y is a center height of a lens surface, Z is a displacement value of the aspherical structure from the optical axis by taking a surface vertex as the reference at a position with a height Y in the optical axis direction, C is a curvature radius of a vertex of the aspherical surface, and K is a cone coefficient; and $\beta_i$ represents an aspherical coefficient at the 1st time.

With reference to FIG. 11, a spot diagram of Embodiment 4 is shown. The spot diagram is a diffuse pattern where after a plurality of lights passes through the optical system, intersection points of the lights emitted from a point and an image surface are not concentrated at a same point due to aberration and spread over in a certain range, and the diffuse pattern is used for evaluating imaging quality of the projection optical system. In Embodiment 4, a maximum value of image points in the spot diagram corresponds to a maximum field of view, and the maximum value of image points in the spot diagram is 8.782 mm.

With reference to FIG. 12, a diagram of a MTF of Embodiment 4 is shown. The MTF refers to a relation between a modulation degree and the number of line pair per millimeter in an image and is used for evaluating ability to restore scenery details.

Figure 13:
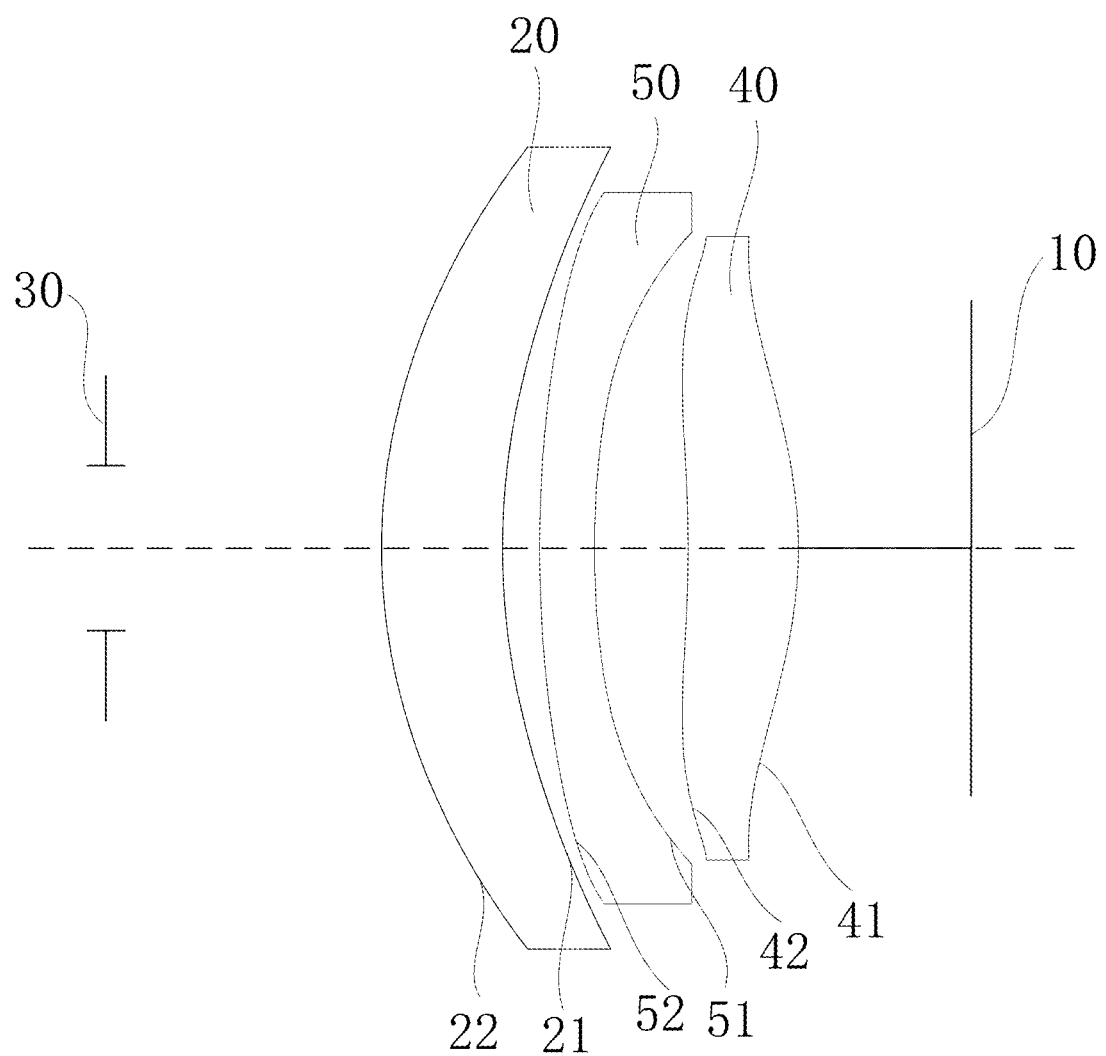
FIG. 13 is a schematic diagram of an optical structure of Embodiment 5 of the compensating lens set of the present invention.
Figure 14:
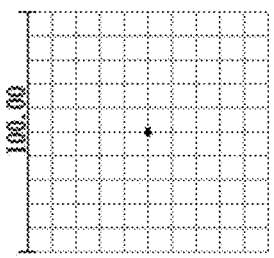
FIG. 14 is a spot diagram of Embodiment 5 of the compensating lens set of the present invention.
Figure 14:
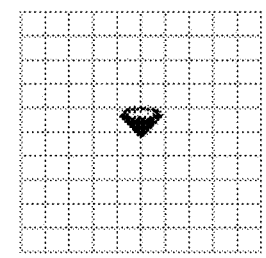
Figure 14:
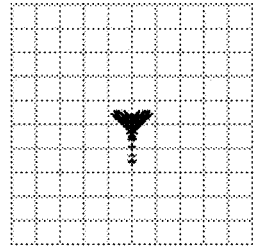
Figure 14:
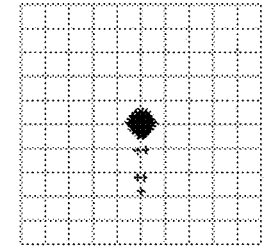
Figure 15:
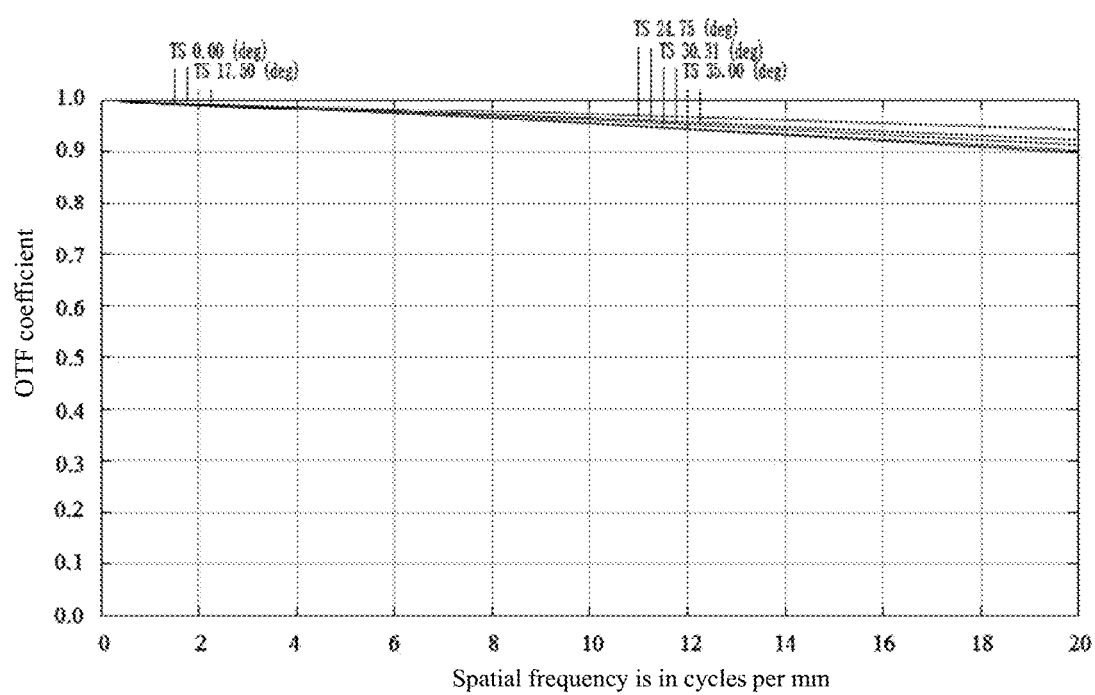
FIG. 15 is a diagram of a modulation transfer function of Embodiment 5 of the compensating lens set of the present invention.

With reference to FIGS. 13-15, in Embodiment 5, the folded optical path system is of a single-lens structure, the compensating lens is a separated aspherical lens combination, and optical system design data is shown in Table 5 below:

TABLE 5

| Type | Surface number | Surface type | Curvature | Thickness | Material | Dimensional radius | Cone coefficient | α4 |
|---|---|---|---|---|---|---|---|---|
| | Object surface | Aspherical | Infinity | Infinity | | 3 | 0 | |
| | Diaphragm 30 | Aspherical | Infinity | 10 | | 14.58 | 0 | |
| Folded optical path system | Fourth surface 22 | Aspherical | 21.15 | 4.39 | E48R | 14.58 | −1 | 6.12E-06 |
| | Third surface 21 | Aspherical | 24.81 | 8.52 | | 14.58 | −3.27 | 5.52E-06 |
| Compensating lens set | Sixth surface 52 | Aspherical | 47.23 | 2.00 | E48R | 12.94 | | |
| | Fifth surface 51 | Aspherical | 37.93 | 3.39 | | 11.48 | | |
| | Second surface 42 | Aspherical | −42.87 | 4.0 | PMMA | 11.34 | | |
| | First surface 41 | Aspherical | −15.77 | 6.26 | | 11.05 | | |
| | Image surface | Spherical | Infinity | | | 8.99 | 0 | |

In Embodiment 5, parameters of the folded optical path system are as follows:

A maximum field of view of the folded optical path system is 70 degrees, and a system length of the folded optical path system is less than 13 mm, the system length of the folded optical path system referring to a distance from the display unit 10 to a side surface, away from the display unit 10, of the folded optical path system. A lens diameter of the folded optical path system is less than 40 mm, an optical transfer function value of the folded optical path system at a frequency of 201 p/mm is greater than or equal to 0.5, a system focal length of the folded optical path system is 16.19 mm, and SPHA of the folded optical path system is 0.27.

The first surface 41 and the second surface 42 may be an even-order aspherical structure, where an even-order aspherical surface satisfies the following relation:

$$z = \frac{CY^2}{1 + \sqrt{1 + (1+k)C^2Y^2}} + \sum_{i=2}^{N} \alpha_i Y^{2i}$$

where Y is a center height of a lens surface, Z is a displacement value of the aspherical structure from the optical axis by taking a surface vertex as the reference at a position with a height Y in the optical axis direction, C is a curvature radius of a vertex of the aspherical surface, and K is a cone coefficient; and $\alpha_i$ represents an aspherical coefficient at the 1st time.

In another embodiment, the second surface 42 and the fourth surface 22 may also be odd-order aspherical structures, where an odd-order aspherical surface satisfies the following relation:

$$z = \frac{CY^2}{1+\sqrt{1+(1+k)C^2Y^2}} + \sum_{i=2}^{N}\beta_i Y^i$$

where Y is a center height of a lens surface, Z is a displacement value of the aspherical structure from the optical axis by taking a surface vertex as the reference at a position with a height Y in the optical axis direction, C is a curvature radius of a vertex of the aspherical surface, and K is a cone coefficient; and βi represents an aspherical coefficient at the 1st time.

With reference to FIG. 14, a spot diagram of Embodiment 5 is shown. The spot diagram is a diffuse pattern where after a plurality of lights passes through the optical system, intersection points of the lights emitted from a point and an image surface are not concentrated at a same point due to aberration and spread over in a certain range, and the diffuse pattern is used for evaluating imaging quality of the projection optical system. In Embodiment 5, a maximum value of image points in the spot diagram corresponds to a maximum field of view, and the maximum value of image points in the spot diagram is 8.991 mm.

With reference to FIG. 15, a diagram of a MTF of Embodiment 5 is shown. The MTF refers to a relation between a modulation degree and the number of line pair per millimeter in an image and is used for evaluating ability to restore scenery details.

The present invention further provides a virtual reality apparatus, the virtual reality apparatus includes the optical system of any one of the above embodiments, a specific structure of the optical system refers to the above embodiments, and since the optical system uses all the technical solutions of all the embodiments, all the beneficial effects brought by the technical solutions of the embodiments are at least achieved and are not repeated here.

The above are only preferred embodiments of the present invention and do not limit the patentable scope of the present invention, and equivalent structural transformation made by utilizing the contents of the specification and accompanying drawings of the present invention or direct/indirect application in other related technical fields fall within the patentable scope of protection of the present invention under the inventive concept of the present invention.

What is claimed is:

1. A compensating lens set for application to a folded optical path system, the folded optical path system sequentially comprising, in an optical axis direction, a display unit adapted to emit incident light and a first lens set and a diaphragm;
   wherein the compensating lens set is arranged between the first lens set and the display unit, the compensating lens set comprising a first compensating lens having a first surface proximate to the display unit and a second surface distal from the display unit, and configured to eliminate spherical aberration of the folded optical path system, wherein the first surface and the second surface are each aspherical structures;
   the first lens set further having a third surface proximate to the display unit and a fourth surface distal from the display unit; such that the incident light emitted by the display unit is reflected by the third surface and the fourth surface;
   wherein the incident light enters the first compensating lens from the first surface, is emitted out of the first compensating lens from the second surface, passes through the first lens set, and is transmitted to the diaphragm;
   wherein the compensating lens set further comprises a second compensating lens arranged between the first compensating lens and the first lens set, having a fifth surface proximate to the first compensating lens and a sixth surface distal from the first compensating lens; and
   wherein the fifth surface and the sixth surface are each spherical surfaces, and a refractive power of the compensating lens set is the opposite of a refractive power of the first lens set.

2. The compensating lens set of claim 1, wherein the first compensating lens and the second compensating lens are separated from each other or connected with each other by one or more of glue-bonding and tight-lock coupling.

3. The compensating lens set of claim 1, wherein the fifth surface and the sixth surface are each aspherical structures.

4. The compensating lens set of claim 1, wherein a distance from a center of the display unit to a center of the fourth surface is less than or equal to 25 mm.

5. The compensating lens set of claim 1, wherein the compensating lens set is made of an optical plastic material.

6. A virtual reality apparatus, comprising:
   a folded optical path system, and
   the compensating lens set of claim 1.

\* \* \* \* \*